Sept. 2, 1947.          M. MacDONALD          2,426,779
RELAY VALVE APPARATUS
Filed June 14, 1943          3 Sheets-Sheet 3

INVENTOR
MAURICE MacDONALD
BY Virgil F. Davis and
William P. Schmidt
ATTORNEYS

Patented Sept. 2, 1947

2,426,779

UNITED STATES PATENT OFFICE 2,426,779

RELAY VALVE APPARATUS

Maurice MacDonald, New York, N. Y., assignor to The M. W. Kellogg Company, New York, N. Y., a corporation of Delaware Application June 14, 1943, Serial No. 490,960

3 Claims. (Cl. 277—60)

1

This invention relates to a relay valve apparatus, and particularly to apparatus for controlling the operation of pneumatically operable actuating devices.

A particular application for my improved valve apparatus may be found in time and cycle control arrangements.

Time-cycle controllers are widely used in various processing industries for accurately controlling the time and sequence of the processing operations, and for uniformly duplicating the process. For uniformity and accurate selective control, it has been found in practice that automatic timers of the type described hereinafter and illustrated in the accompanying drawings produce results which are difficult to obtain by manual operation.

A principal object of my invention, therefore, is to provide a relay valve of simple and comparatively low-cost construction.

A further object is to provide a simple, low-cost, and sturdy relay valve for activating fluid pressure responsive devices by controlling the pressure supply from a constant source to said devices, the pressure supply being controllable through the application of external mechanical force to said valve.

These and other objects are effected by my invention, and will be apparent from the following description and claims taken in connection with the accompanying drawings forming a part of this application, in which:

My improved valve will be particularly described and illustrated in connection with a typical time-cycle process control apparatus wherein pneumatically operable means are provided for each apparatus or device which initiates or terminates a step in the process. The controller is inserted between a compressed air supply and the various switches, valves, etc., which control each step of the process. The compressed air is distributed to each pneumatically operable device in controlled sequence and for predetermined time intervals. By selectively creating conditions of atmospheric or superatmospheric pressure within

2 each of the conduits leading to the pneumatic devices, the latter are operated in accordance with any desired pattern of time and sequence control.

Figure 1:
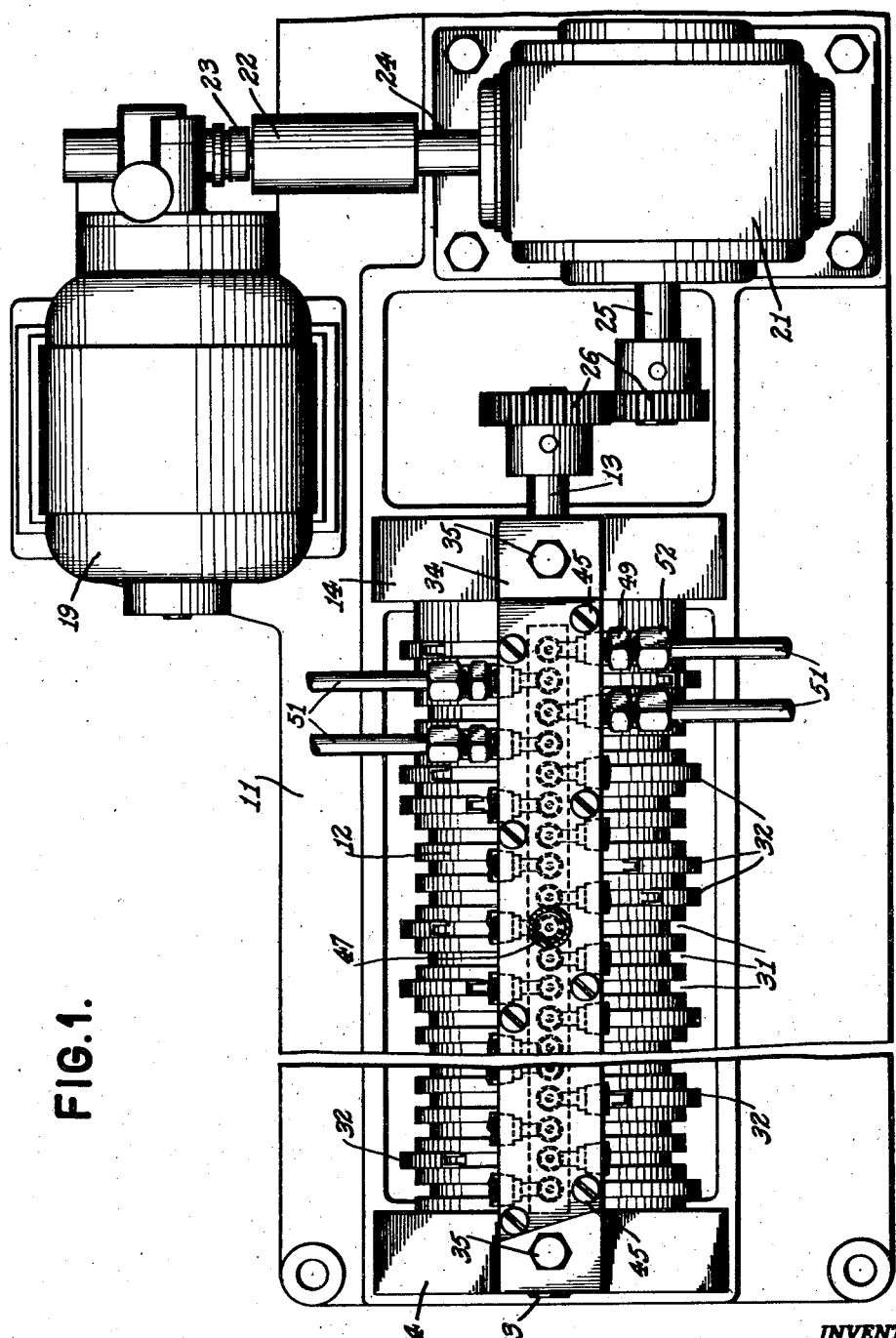
Fig. 1 is a plan view of a time-cycle control apparatus embodying my improved relay valve.
Figure 2:
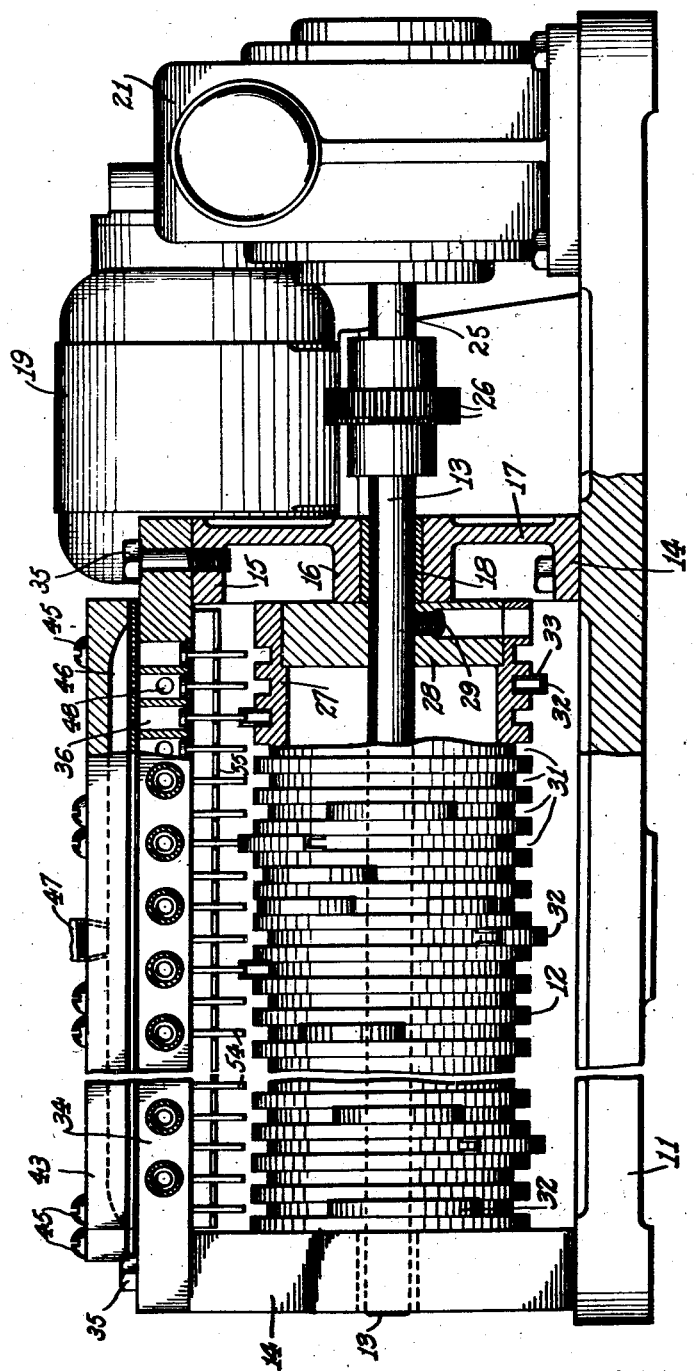
Fig. 2 is an elevation view of the apparatus of Fig. 1, with portions broken away to show the interior construction.

Referring to the drawings, in Fig. 1 the general assembly is shown in plan view. The various parts of the controller apparatus are mounted on a base-plate 11. A rotary drum 12 is mounted horizontally above the surface of base-plate 11, being secured to a shaft 13 journalled in upright bearing blocks 14 attached to the base-plate.

Bearing blocks 14 comprises rim, hub, and web sections, numbered 15, 16, and 17, respectively. Hub 16 is provided with a removable bushing 18 in which shaft 13 rotates freely.

Drum 12 is rotated continuously by means of a gear-motor 19 connected to a speed reducer 21. A flexible coupling 22 connects the motor shaft 23 to the driving shaft 25 of the speed reducer. Shaft 13 and the driven shaft 25 of the speed reducer are axially off-set. Spur gears 26 connect the ends of shaft 13 and 25. Interchangeable additional pairs of spur gears may be provided to permit a plurality of driving speeds for the drum 12. Since the driving mechanism and the cam drum for actuating the valves per se form no part of my invention, they will be but briefly described, and it is to be understood that any other suitable means for rotating drum 12 slowly and uniformly about its axis and for tripping the various control valves may be substituted.

The drum 12 comprises a hollow cylinder 27 rabbeted at each end to receive circular end plates 28. End plates 28 are radially drilled and tapped to receive set screws 29, by which the cylinder is rigidly secured to the shaft 13. Equi-spaced longitudinally along the drum 12 are a plurality of circumferential grooves 31. A groove 31 is provided for each switch, valve, or other control for one step or operation in the process.

Channelled or U-shaped ring segments 32, having flexible sides 33, are inserted within each of the grooves 31. The flexible sides 33 are in compression within the groove sufficiently to prevent slippage once the segments have been properly positioned. The channel walls 33 are high enough to leave a substantial portion of the ring segment extending out of the groove. The arc length of each ring segment, and the number and position of the ring segments within each groove varies in accordance with the time cycle for the particular device controlled by said groove. The filled and unfilled portions of the groove 31 represent "on" and "off" conditions for the device to be controlled. For a fixed rotating speed of the drum 12, each ring segment may be made to represent a predetermined number of minutes, or other time intervals, for the "on" or "off" condition of the valve or switch. Where a condition is to maintain for the greater part of a cycle, a plurality of the ring segments may be inserted contiguously end-to-end. While the compressional forces exerted by the ring segment walls against the sides of the grooves is sufficient to prevent movement of the ring segments during operation of the controller, the ring segments may readily be pried out of the groove, or slid therealong to new positions, when it is desired to change the time cycle.

Figure 3:
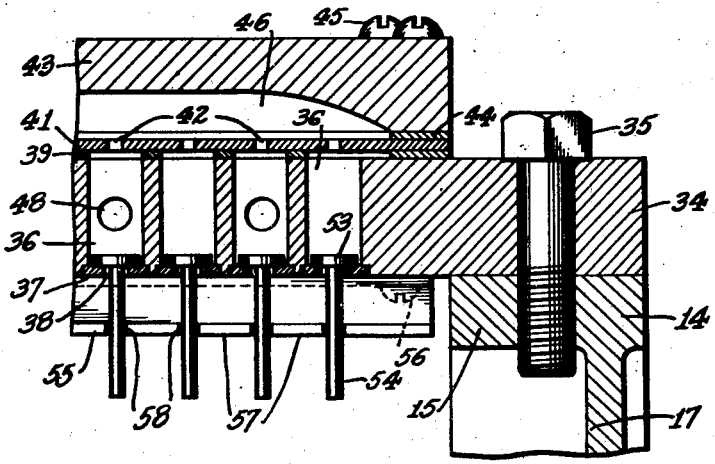
Fig. 3 is an enlarged fragmentary view of the upper central portion of Fig. 2, clearly showing the air chamber and valve construction.
Figure 4:
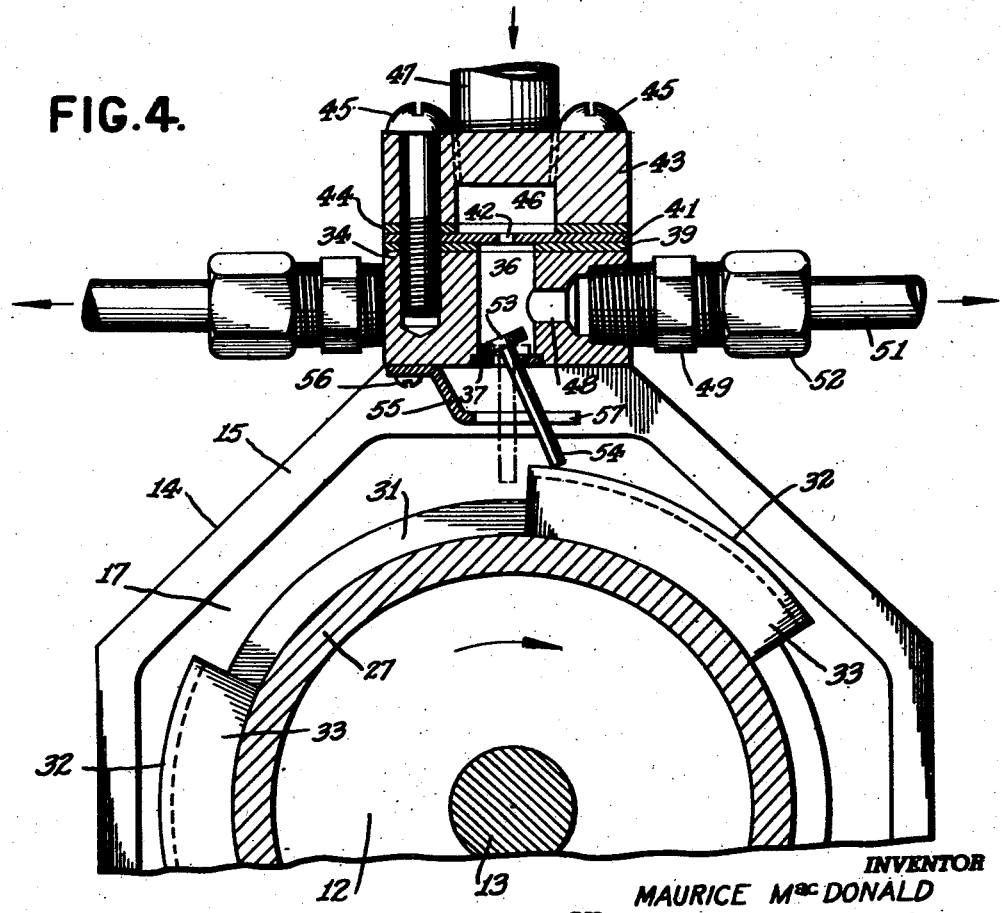
Fig. 4 is an enlarged end view in section, taken along the line 4—4 of Fig. 2.

A chamber block 34 comprising a long narrow body of rectangular cross-section is supported at each end on top of the bearing blocks 14. Stud bolts 35 set in the rim 15 hold the chamber block in place. The chamber block 34 is positioned vertically above and parallel to the axis of the drum 12, as may clearly be seen in Figs. 1 and 4. The details of the chamber block are most clearly shown in the enlarged views of Figs. 3 and 4. A plurality of holes, individual to the grooves in drum 12, are drilled vertically through the chamber block on diametric lines through the center of each groove to form air chambers 36. The lower edge of each air chamber is rabbeted to receive a valve seat disk 37, having a central opening 38. The valve seat disks may be held securely in place by any means, such as brazing, soldering, or shrinking, which will provide a joint capable of withstanding the pressures within the air chambers. Covering the top of the chamber block 34, and separated therefrom by a gasket 39, is a perforate plate 41 having a row of small openings 42, each of which is directly over one of the air chambers 36. A channelled manifold 43 and a gasket 44 fit over the chamber block 34, being secured in place by screws 45 extending through holes in the cover and set in the body of the chamber block.

Manifold 43 and plate 41 thus form a long air distributing chamber 46 which communicates with each of the air chambers 36 by means of the openings 42. An air inlet pipe 47 supplies compressed air, from a source not shown, to the air distributing chamber 46 through an opening in the top of the manifold 43 midway between the ends.

Each of the air chambers 36 has a side air outlet 48, the outlets being located alternatingly in the front and rear walls of the air chambers. The arrangement is clearly shown in Fig. 1. Each outlet 48 is pipe-tapped at its outer end to receive a flared compression union 49, from which a tube 51 extends for connection to the switch, valve, or other device. A nut 52 provides compression for a fluid-tight joint between the end of tube 51 and union 49.

The flow path for the compressed air from the source, which has not been shown, is through inlet pipe 47 into air distributing chamber 46, through the small openings 42 of plate 41 into the various air chambers 36, through outlets 48 of the air chambers into and through the tubes 51 to the pneumatic devices, also not shown. The air pressure within the tubes 51 is normally sufficient to maintain the pneumatic devices fixed in one condition of either "on" or "off." In order to change the condition of the pneumatic device, means is provided to suddenly release the pressure within the tube 51. For this purpose, a valve having head and stem portions 53 and 54, respectively, is provided in the bottom of each air chamber 36.

Valve-head 53 is a flat disk having a polished undersurface which, when pressed against the top surface of disk 37, forms an effective seal against the escape of air from the chamber 36. The diameter of valve-head 53 is slightly less than the diameter of air chamber 36, sufficient clearance being allowed to permit the disk to be tipped so that the air pressure within the chamber may be suddenly released. The valve-stem 54 depends substantially centrally through the valve opening 38 in the disk 37 which forms the bottom of the air chamber 36. Valve opening 38 is considerably larger than the diameter of valve-stem 54 so that the latter may move laterally to tip the valve-head 53 off its seat 37. Hanging in its normal position, valve-stem 54 is long enough to project into the path of the ring segments 32, as shown by the dotted lines in Fig. 4. As drum 12 rotates, the forward end of ring segments 32 engage the lower end of the valve-stem and tip the valve. The lower edge of the pin then rides along the periphery of the ring segment until it reaches the rear end, whereupon it falls back to its normal position.

To insure more precise timing, and to prevent the valve-stems 54 from riding off the side edges of the ring segments 32, an off-set comb 55 is attached to the underside of the chamber block 34 by screws 56. The tines 57 of the comb are wide, and are spaced so as to provide narrow slots 58 in which the valve-stems may freely slide.

In operation, the valves are seated firmly on the valve seats by reason of the pressure built up in the air chambers. When the valve-stem is tipped so as to lift the valve-head, the pressure drop within the air chamber is instantaneous. Air is still being admitted into the chamber, however, through the small orifice 42 in the plate 41 which separates the air chambers from the distributing chamber 46. Inasmuch as the orifice 42 is small, the escape of air therethrough is not rapid. When the valve closes by reason of a gap between the ring segments, the pressure within the air chamber builds up gradually until it is sufficient to operate the pneumatic device connected with that chamber.

I claim:

1. In a relay valve apparatus for activating a plurality of pneumatically operable devices, a chamber block having a row of holes, each having a side outlet connectable with said pneumatically operable devices; closure plates sealing one end of said holes, each having a valve opening; an orifice plate covering the other end of said row of holes to divide said chamber block into a plurality of closed pressure chambers, each chamber having an orifice communicating therewith; a recessed manifold secured above said orifice plate to form therebetween an air distributing chamber communicating with said pressure chambers, said manifold having an inlet connectable with a pneumatic pressure source; an escape valve in each of said valve openings having a head portion covering the opening so that fluid pressure within said chambers acts to close said escape valves, and an elongated stem portion attached centrally of said head portion and depending outwardly through said valve opening; said escape valves being movable by a laterally applied force at the end of said stem about a point on the perimeter of said head portion to provide substantially instantaneous release of the pressure within said chambers.

2. In a relay valve apparatus for activating a plurality of pneumatically operable devices, a chamber block having a row of holes, each having a side outlet connectable with said pneumatically operable devices; closure plates sealing one end of said holes, each having a valve opening; an orifice plate covering said row of holes to divide said chamber block into a plurality of closed chambers, each chamber having an orifice communicating therewith; a recessed manifold secured above said orifice plate to form therebetween an air distributing chamber, said manifold having an inlet connectable with a source of pneumatic pressure; an escape valve in each of said valve openings having a head portion covering the opening so that pressure within said chamber acts to close said escape valve, and an elongated stem portion attached centrally of said head portion and depending outwardly through said valve opening; said escape valve being moveable by a laterally applied force at the end of said stem about a point on the perimeter of said head portion to provide substantially instantaneous release of pressure within said chamber; an elongated guide plate secured to the underside of said chamber block, said guide plate having an extended portion provided with a plurality of slots to receive the valve stems.

3. In a relay valve apparatus for activating a plurality of fluid pressure responsive devices, means defining a plurality of fluid chambers each having a valve port, a manifold in communication with each of said chambers for distributing fluid thereto and having an inlet connectable with a source of fluid pressure, an orifice plate connected between said manifold and said chambers providing a restricted fluid passage to each of the latter, said restricted fluid passage being substantially smaller than said valve port, an outlet in each of said chambers connectable with said pressure responsive devices, and pressure release means for each of said chambers comprising a valve member disposed in said valve port, said valve member having a head portion disposed within the chamber to cover said valve port so that pressure within the chamber acts to close and seal said port, and a stem portion attached centrally of said head portion and extending loosely through said valve port, said valve member being tiltable about a point on the perimeter of said head portion by a force applied laterally to said stem portion externally of said chamber.

MAURICE MacDONALD.

REFERENCES CITED

The following references are of record in the file of this patent:

UNITED STATES PATENTS

| Number | Name | Date |
|---|---|---|
| 1,885,565 | Terry | Nov. 1, 1932 |
| 258,433 | Keith | May 23, 1882 |
| 2,339,728 | Temple | Jan. 18, 1944 |
| 665,540 | Kemp | Jan. 8, 1901 |
| 1,460,363 | Bethel | July 3, 1923 |
| 2,163,864 | Bissell | June 27, 1939 |
| 1,846,690 | Page | Feb. 23, 1932 |

FOREIGN PATENTS

| Number | Country | Date |
|---|---|---|
| 288,097 | Great Britain | 1928 |
| 264,396 | Great Britain | 1927 |